United States Patent [19]
Tirrell et al.

[11] 3,809,966
[45] May 7, 1974

[54] SECTIONAL LAMINATED STRUCTURAL SYSTEM FOR AREA DISTRIBUTION OF ELECTRICAL POWER AND SIGNAL ENERGY

[75] Inventors: C. Barry Tirrell, Duxbury; Walter L. Reid, Jr., Mattapoisett, both of Mass.

[73] Assignee: Dole Electro-Systems, Incorporated, Palo Alto, Calif.

[22] Filed: July 5, 1972

[21] Appl. No.: 269,214

Related U.S. Application Data

[63] Continuation-in-part of Ser. No. 191,392, Oct. 21, 1971.

[52] U.S. Cl................ 317/117, 339/96, 174/70 R, 317/112, 317/101 CE
[51] Int. Cl. ............................................. H02b 1/04
[58] Field of Search ........ 317/99, 101 CM, 101 CE, 317/112, 117; 174/70 R; 339/96

[56] References Cited
UNITED STATES PATENTS

| | | | |
|---|---|---|---|
| 3,401,469 | 9/1968 | Shaver | 35/8 |
| 3,553,675 | 1/1971 | Shaver | 174/70 R |
| 3,522,474 | 8/1970 | Piel | 317/101 CM |
| 3,151,923 | 10/1964 | Bell | 317/112 |

Primary Examiner—Robert K. Schaefer
Assistant Examiner—Gerald P. Tolin
Attorney, Agent, or Firm—Owen, Wickersham & Erickson

[57] ABSTRACT

A sectional laminated structure system for transmitting electrical power and signal energy over an area so that devices using power and signal energy can be coupled to the structure at randomly selected locations thereon. The system is comprised of a series of interconnected panels, each panel being a rigid or semi-rigid combination of laminated elements including electrically conductive layers for a power carrying sub-system and/or transmission means for a signal distribution sub-system. The conductive layers are separated by a dielectric material. Means are included for connecting the panels to provide power and signal transmission continuity, and other means provide for isolating groups of panels from other panels to form selected areas of power and signal distribution.

22 Claims, 10 Drawing Figures

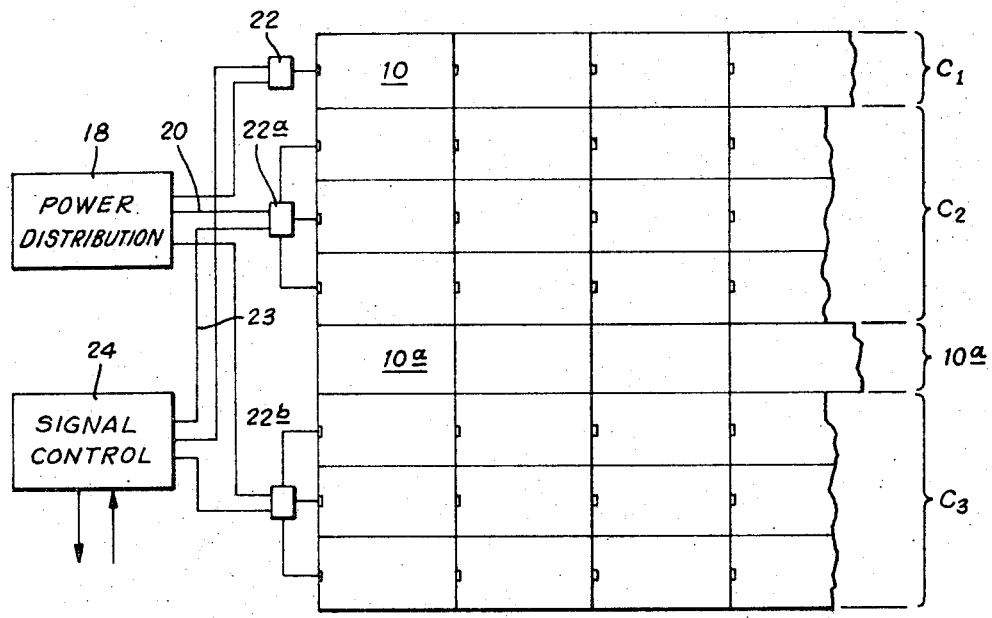
FIG_2
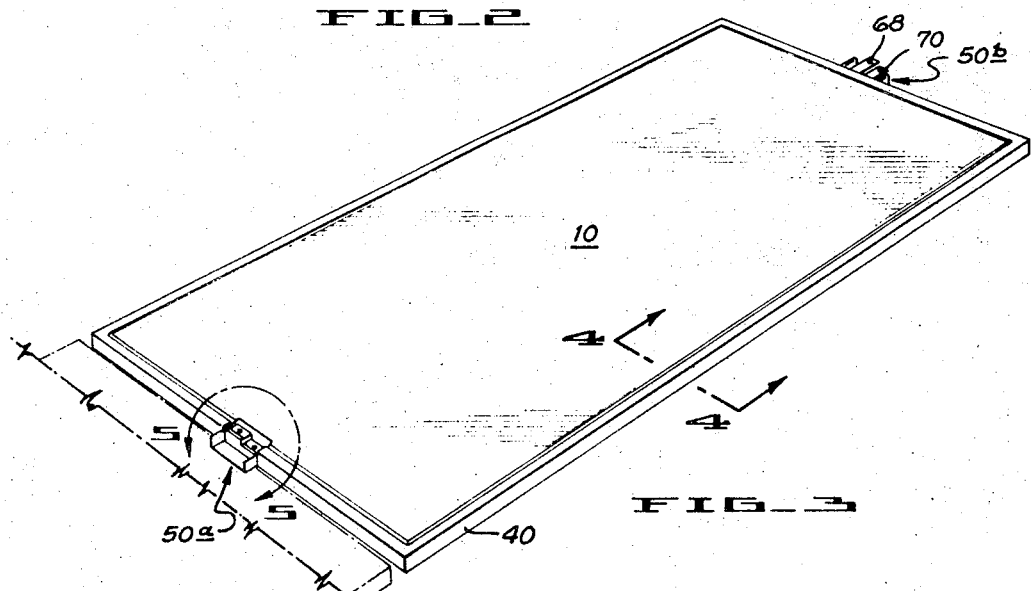
FIG_3
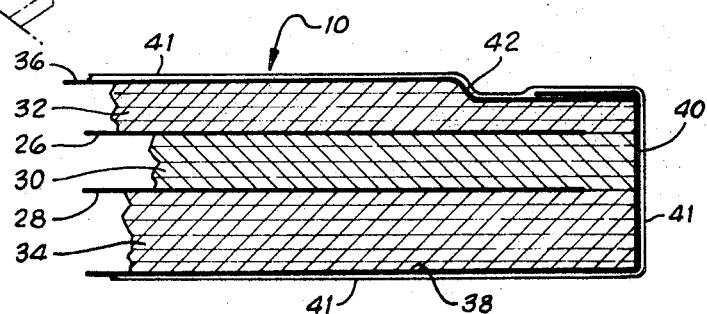
FIG_4

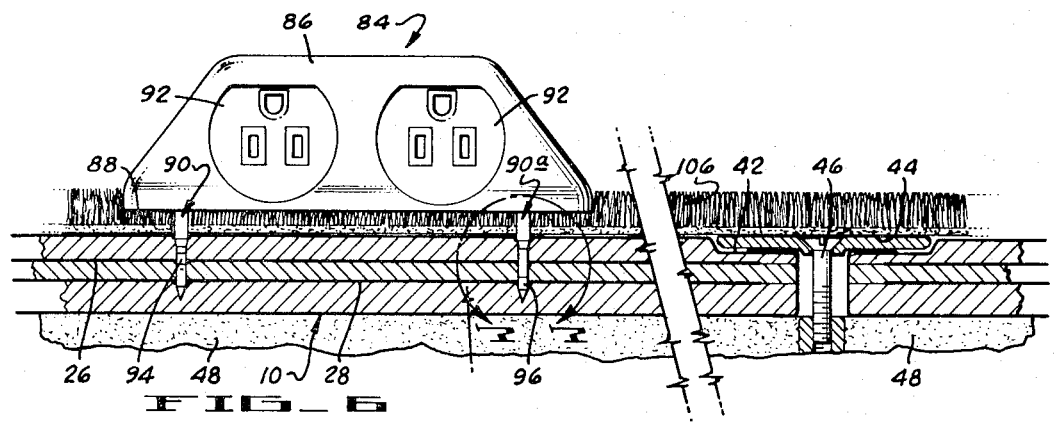
FIG_6
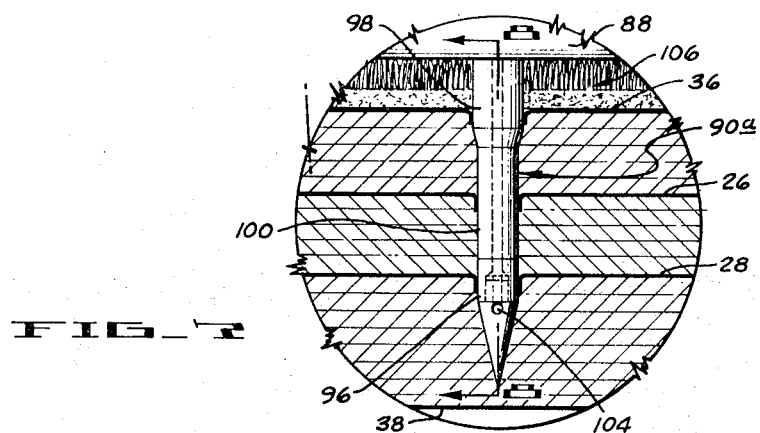
FIG_7
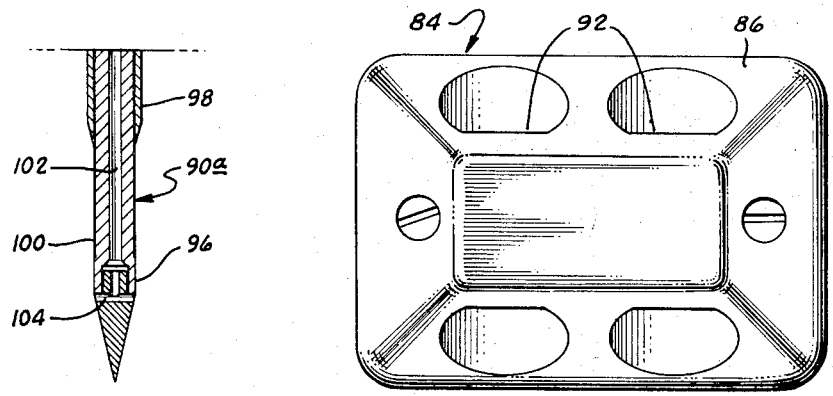
FIG_8  FIG_9

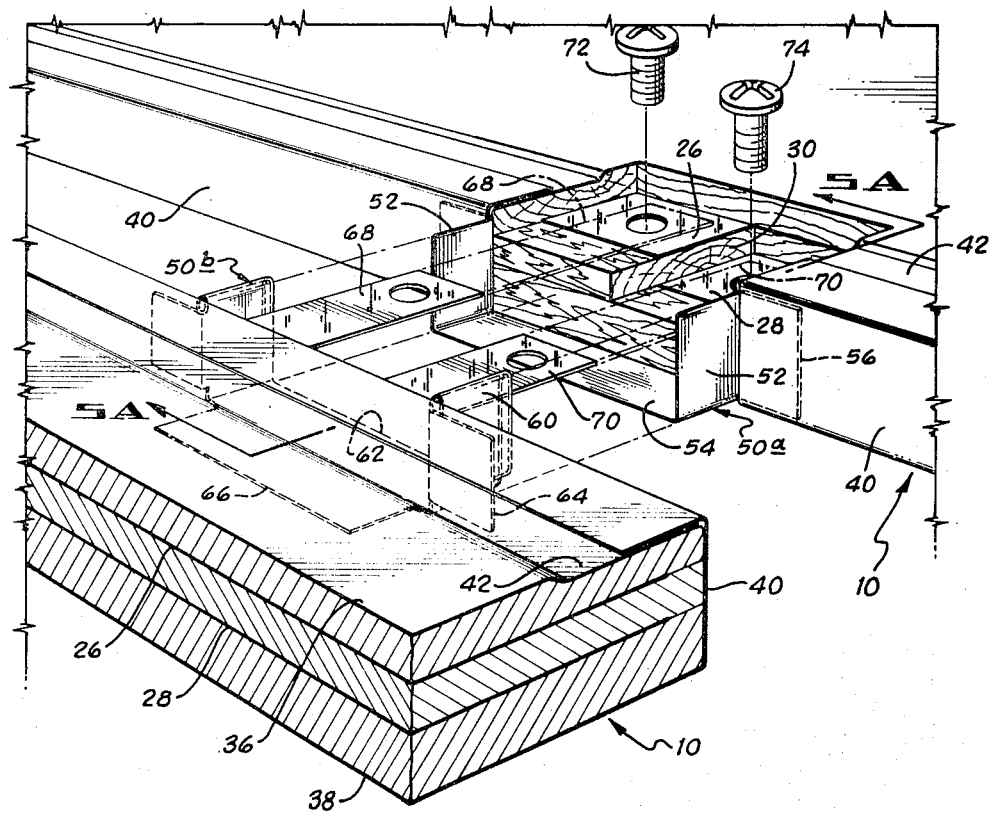
FIG_5
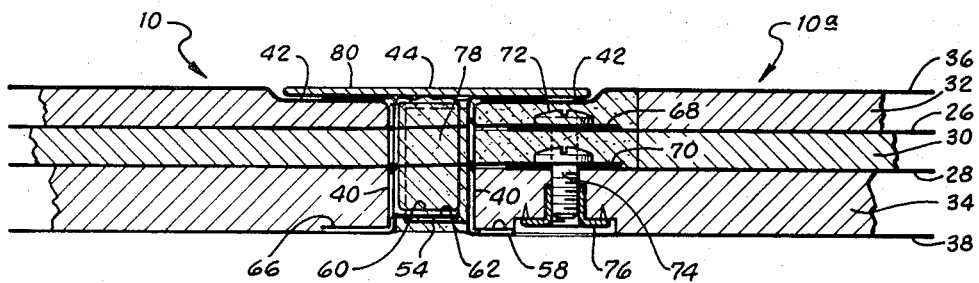
FIG_5A

SECTIONAL LAMINATED STRUCTURAL SYSTEM FOR AREA DISTRIBUTION OF ELECTRICAL POWER AND SIGNAL ENERGY

This application is a continuation-in-part application of Ser. No. 191,392 filed on Oct. 21st, 1971.

This invention relates to an improved laminated structure system adapted for installation in buildings for transmitting electrical power and signal energy throughout areas where installed, and more particularly it relates to connectable panel-like units for use in forming such a system.

Conventional building designs prior to the present invention provided for the distribution of power by means of complex wiring systems using junction boxes and receptacles for connection with power consuming devices. To accommodate electrical apparatus located at various points on large open floor areas, conduit runs and raceways were built into floor and wall structure to retain electrical conductors. Access to such permanent facilites was required to provide the necessary power receptacles and therefore the original installation of such receptacles and particularly any subsequent relocation thereof due to changes in the floor plan arrangement was an expensive and time consuming process. Similar problems were prevalent with the installation of signal equipment such as phones, data terminals or intercom equipment. As one approach for solving these problems, it has been proposed in U.S. Pat. No. 3,401,469 to provide a floor covering capable of carrying power and signal energy that can be extracted at randomly selected areas by probe coupler devices. This essentially eliminates the need for permanent floor ducting and the other electrical apparatus required for conventional power and signal distribution systems in buildings.

The present invention provides a refined and improved laminated floor structure system having particular features which enhance the practicality and versatility of the basic concept. In general, our invention provides a sectional laminated structure system comprised of prefabricated panel units capable of furnishing electrical power and signal transmission over their entire area. These panels are rigid or semi-rigid, are moisture sealed and have sufficient compressive strength to support normal floor loading. Means are provided on the panel units so that they can be readily connected to form branch circuits of any convenient size or area. Moreover, they are easily handled for shipping and storage and their installation can be accomplished rapidly with ease by relatively unskilled labor and without special tools. Once installed the laminated panels may be covered by a conventional covering such as a carpet or floor tile. Each panel has internal conductive layers that carry conventional electrical power service (e.g. 110 volt A.C.) while outer conductive layers serve as grounding and/or shielding layers. The internal conductive layers also serve to carry multiplexed signal energy which is applied to them by suitable means. Both the power and signal energy are extracted from the laminated panels by a probe coupler that penetrates the panel and has pins that contact the proper conductive layers.

Accordingly, it is therefore one object of the present invention to provide an area type electrical power and signal carrying system formed from a series of panel-like units which can be interconnected in various numbers and combinations to conform to a particular installation area.

Another object of the present invention is to provide a laminated panel system capable of transmitting electrical power and signal energy that is structurally rigid or semi-rigid and thus capable of providing structural strength for floors in addion to its transmission capabilities.

Yet another object is to provide a laminated power carrying panel that is capable of withstanding relatively high and concentrated compression loads.

Another object is to provide a laminated panel with internal conductive layers for transmitting power and signal energy that are effectively sealed to prevent external moisture penetration while also preventing any substantial escape of internal moisture from the dielectric layers.

Another object of our invention is to provide a power carrying laminated panel system that provides a high degree of safety in transmitting the electrical power, and is electrically shock-proof, even if penetrated inadvertently by conductive means.

Still another object of our invention is to provide a panel unit for an area type power and signal distribution system that provides a relatively high gripping or anchoring force to secure probe couplers installed on the panel. This feature not only serves to hold the couplers firmly in place but it also maintains low resistance contacts between coupler pins and the panel conductive layers.

Another object of our invention is to provide a laminated panel unit for a power distribution system that can be easily installed and connected to other units similar to the system without the need for highly skilled labor or special tools.

Yet another object of our invention is to provide a laminated panel for transmitting electrical power and signal energy that is electrically shielded by an outer conductive skin that completely encloses the internal conductive paths for power and signal transmission, thereby substantially eliminating interference to external electrical devices.

Other objects, advantages and features of the present invention will become apparent from the following detailed description taken with the accompanying drawings in which:

FIG. 2 is a schematic plan view of a laminated panel system according to the present invention showing a typical area pattern with branch circuits;

FIG. 3 is a view in perspective of a laminated panel according to the present invention;

FIG. 4 is an enlarged fragmentary view in section taken along the line 4—4 and showing one edge portion of the panel of FIG. 3;

FIG. 5 is an enlarged fragmentary view in perspective taken at line 5—5 of FIG. 3 and showing an edge interconnector for our laminated panel;

FIG. 5A is a view in section taken along line 5A—5A of FIG. 5;

FIG. 6 is a fragmentary view in elevation and in section showing a pair of joined panels in laminated panel section and a probe coupler installed in one panel;

FIG. 7 is an enlarged view in section showing one pin of the probe coupler installed within the panel and taken along line 7—7 of FIG. 6;

FIG. 8 is a view of the probe coupler pin taken along line 8—8 of FIG. 7; and

FIG. 9 is a top view of the probe coupler.

Figure 1:
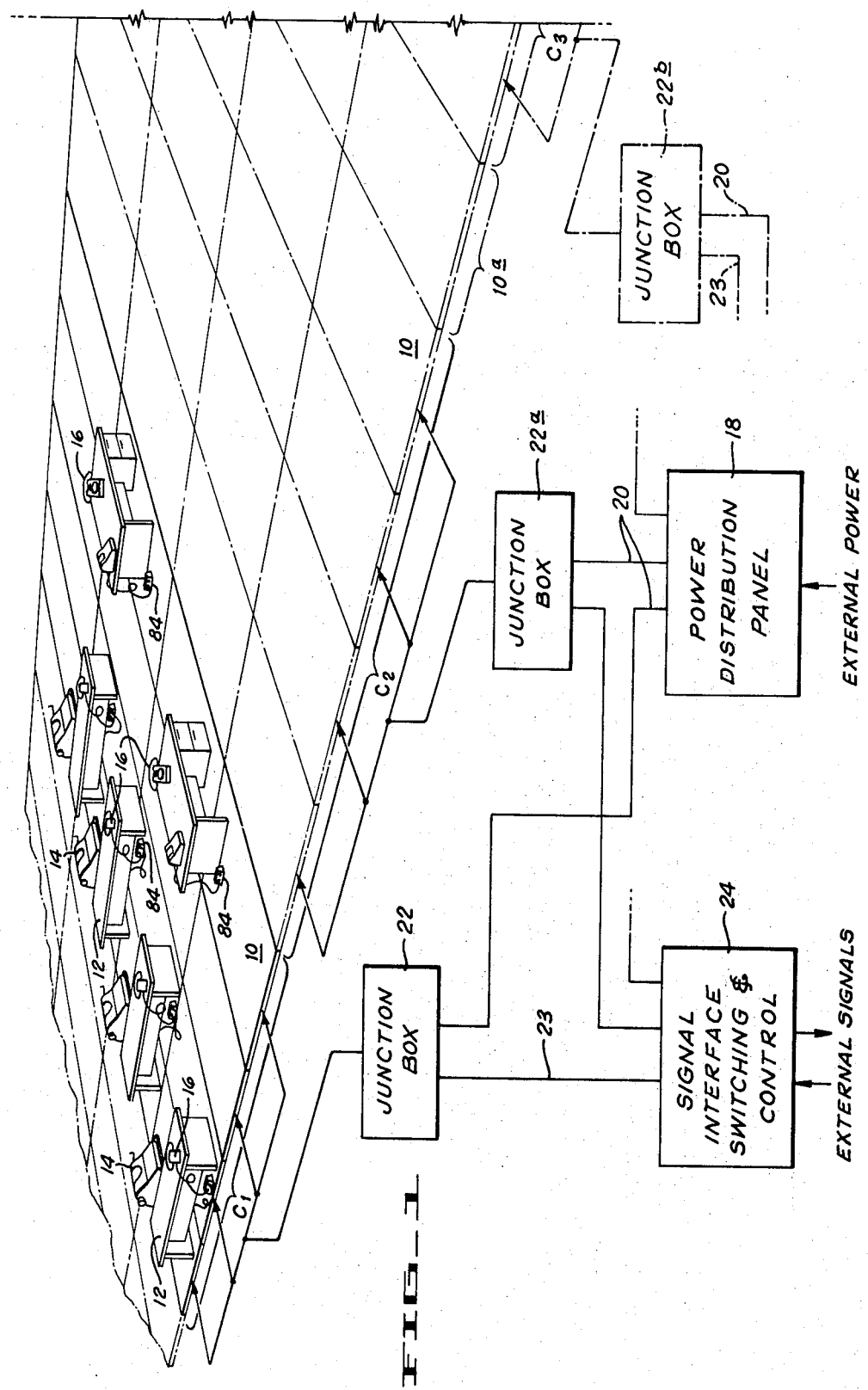
FIG. 1 is a view in perspective showing a laminated panel installation embodying the principles of the present invention with portions schematically represented.

In FIG. 1 of the drawing an installation of laminated panels 10 according to the present invention is shown as it would appear in a typical office building where both electrical power and signal channels must be provided over a large floor area. As illustrated, such an area formed by a plurality of panels may accommodate a number of desks 12 and each desk may have an electric typewriter, adding machine, lamp or some other electrical appliance 14. In addition, each desk may also have a telephone or some other data or signal receiver and transmitting device 16. The present invention affords a means for originally installing these appliances and signal devices with ease and convenience or of changing their location when the inevitable changes in the overall office arrangement occur. Although a business office arrangement for a building is shown in FIG. 1 to illustrate a typical installation for our laminated panel system, it should be understood that the system is equally applicable to other installations such as schools, homes, department stores and many other types of facilities where the distribution of electrical power and/or signal energy is a requirement. In most installations a conventional carpet or floor covering material may be placed over the panels after they are installed.

As shown in FIG. 2, the panels 10 of our system are arranged in an edge to edge manner with several panels being connected in groups $C_1$, $C_2$, $C_3$, etc. to form separate branch circuits covering different areas. Groups may be isolated electrically from each other so that each group or circuit may be separately fused. Filler panels 10a may be installed in areas that do not require power and signal energy. In general, as shown in both FIGS. 1 and 2, external power for a system installation is supplied to a power distribution and control panel 18. From this panel, a power lead 20 is connected to each one of a series of perimeter junction boxes 22, 22a, 22b located at the edge panel of each panel group or branch circuit. Signal interface, switching and control apparatus 24 is provided for receiving external signals and providing switching and control functions for both external and internal signal channels. Signal information from this apparatus is applied through suitable transmission cables 23 and is superimposed on the power leads 20 within the various perimeter junction boxes 22, 22a, etc. Thus, both power and signal energy is applied to the various groups of panels 10 or branch circuits. FIG. 2 illustrates the feature of our invention which enables the areas $C_1$, $C_2$ and $C_3$, etc. comprising different numbers or arrangements of panels to be formed as part of the same system. A more detailed description of a system for applying both power and signal energy to a multi-layered conductive underlayment is set forth in U.S. Pat. application Ser. No. 185,684 filed Oct. 1, 1971.

As shown in FIG. 3, each laminated panel 10 is preferably rectangular shaped with overall dimensions (e.g., 4ft. by 8ft.) that make it convenient to handle, ship, store and install. The panel is comprised of a series of laminated conductive and non-conductive layers that form one rigid or semi-rigid composite unit. As shown in FIG. 4, each panel 10 has an upper and a lower conductive layer 26 and 28 which are separated by a non-conductive or dielectric layer 30 of uniform thickness. The two conductive layers 26 and 28 are made of some metallic material such as a metal foil or sheet or a wire mesh. We have discovered that a particularly effective and desirable material for this panel is a thin copper or aluminum foil having a thickness of around 0.0005–0.006 inches.

For installations requiring a particularly long life and a high degree of resistance to adverse environmental conditions a thicker material may be used for the conductive layers. For example, we may utilize sheets of a low carbon steel, an aluminum alloy or some other sheet metal having a thickness range of 0.006 to 0.020 inches.

Directly above the upper conductive layer is another non-conductive layer 32 and directly below the lower conductive layer is a bottom layer 32 of non-conductive material that is preferably somewhat thicker. These three non-conductive layers 30, 32 and 34 are preferably made of a reasonably penetrable, substantially incompressable material such as a suitable plastic or wood material. Laminated wood sheeting or wood particle board are highly acceptable materials and they may be bonded to the conductive layers 26 and 28 by a combination of pressure and a suitable adhesive. The use of either of the aforementioned materials as a backing for the conductive foil layers provides a high radial stress resulting in a low resistance joint contact when penetrated by the contact pins of a probe-coupler. When the thicker sheet material for the conductive layers is used the function of the backing material to provide high radial stress around a probe pin becomes less critical because the elasticity of conductive material itself provides the high radial stress. The three non-conductive layers of our panel 10 extend beyond the outer edges of the internal conductive layers around the entire periphery of the panel, so that these conductive layers are spaced inwardly from the panel edges. On the top of each panel is a conductive layer 36 and on the bottom is another conductive layer 38 both of which are also made of a metallic sheet or foil material. To afford greater impact resistance and strength to the panel unit the outer conductive layers 36 and 38 are preferably made of the thicker sheet material (e.g., 0.006 – 0.020 inches). These outer conductive layers are interconnected by an edge strip 40 made of a similar conductive material that extends completely around the edge of the panel. This edge strip may be formed in any suitable manner such as by overlapping the edges of the upper and lower conductive layers 36 and 38. Surrounding the entire panel and thus covering these upper and lower conducting layers, we preferably provide a thin but tough protective layer 41 of a suitable dielectric material such as a plastic coating that serves as a durable insulator.

Around the periphery of each panel the top non-conductive layer 32 has a recessed edge forming a shoulder 42 which is also covered by the upper outer conductive layer 36. As shown in FIG. 6 this shoulder accommodates a connector tie-down strip member 44 for joining two adjacent panels in typical installation. When supported on the edge shoulders 42 of adjacent panels this tie-down member is flush with the panel upper surface. Spaced apart holes in the tie-down member are provided to accommodate screws 46 or some other fasteners that can be anchored into the supporting base floor 48 under the panels, thereby holding them firmly in place. The tie-down strip 44 is made of a different material than the upper conductive layer 36 of the panel so that it can react to a sensing device for determining the junctions between panels that are concealed by a floor covering such as carpeting in a typical installation. The sensing of these panel junctions is required in order to install properly a probe coupler device for contacting the internal conductive layers.

When installing a power and signal distribution system using our panels 10 it is necessary that the conductive layers of all of the panels of each group be electrically connected. This interconnection is accomplished by a pair of mating connector units 50a and 50b located on the edge of each panel 10, as shown in FIG. 3. As shown in detail in FIGS. 5 and 5A, the connector unit 50a is formed by removing a rectangular shaped portion of the outer conductive layer 36 along the top of the panel as well as a portion of the edge strip 40 of the same length. Within one half of this exposed area a portion of the top non-conductive layer 32 is removed to expose the upper conductive layer 26. Within the other half of the same interconnection area both the top and intermediate non-conductive layers 32 and 30 together with the upper conductive layer 26 between are removed to expose the lower internal conductive layer 28. Fixed to the edge and bottom of the panel on opposite sides of the exposed edge is a U-shaped member having integral side portions 52 and a connecting bottom portion 54 that is flush with the bottom surface of the panel. These side and bottom bracket portions project outwardly from the edge of the panel at right angles. A pair of tabs 56 extending at right angles from the side portions 52 are retained beneath the edge strip 40 and a bottom tab 58 extending from the bottom connector portion 54 is retained under the bottom conductive layer 38, thereby helping to secure the connector in place.

The mating connector unit 50b comprises an edge section of the panel with a portion of the edge strip 40 removed along a length of panel approximately equal to the exposed section on the connector unit 50a. Attached to the panel is a projecting U-shaped member having side portions 60 and an interconnecting bottom portion 62 that is between these side portions and flush with the bottom surface of the panel. Here, both side portions 60 have a channel shaped cross section with a narrow space between their opposed, parallel channel portions that is sized so that the tab-like side portions 52 of the connector unit 50a will fit snugly therein and provide a good electrical contact between the outer conductive layers 36 and 38 of adjacent panels which will be grounded. The bottom portion 62 overlaps with the bottom portion 54 when the connectors are fitted together. As with the connector 50a the connector 50b has tab portions 64 and 66 integral with the side and bottom portions which extend under the outer conductive layer 38 and edge strip 40 of the panel and serve to hold the connector firmly in place. A pair of upper and lower connector strips 68 and 70 of conductive material are installed in contact with the conductive layers 26 and 28, respectively, and these strips extend outwardly from the edge of the panel having the connector 50b. When two panels are connected, as shown in FIG. 5A, the outer ends of connector strips 68 and 70 lie flush against the exposed surfaces of the conductive layers 26 and 28 on the cutaway section forming the connector 50a. These connector strips are held firmly in place and in contact with their respective conductive layer by a pair of screws 72 and 74 that each are threadedly anchored in a separate sleeve nut 76 fixed to the underside of the panel.

When the connector strips are thus held firmly in place between two adjacent panels, a suitable sealing or potting compound 78 may be used to fill the space between the joined connectors 50a and 50b. A cover plate, which may be an extension 80 of the tie-down connector member 44 or a separate plate member may be utilized to extend over and protect the panel connector units. When two panels are connected their respective notched out connector sections are aligned and the bridging conductive members 68 and 70 are attached to the exposed upper and lower conductive layers 26 and 28 of the two adjoining panels. A single panel connection using the connector units 50a and 50b as just described can be made with relative speed using relatively unskilled labor and is completely adequate for providing continuity of both power and signal transmission between panels.

After the panels 10 have been installed to the desired configuration on a floor (or wall) area a probe coupler 84 can be located at any spot on the panel and then installed into it. Generally, the probe coupler comprises a housing 86 with a base 88 to which are fixed at least two pins 90 and 90a having tapered end portions. Within the housing the upper ends of these pins are connected to contacts of conventional power and/or signal receptacles 92. The probe coupler is installed at its randomly selected location by the application of a downward force that drives the pins through the conductive and non-conductive layers. As shown in FIG. 6 when the probe coupler is properly installed, one pin 90 has a conductive portion 94 along its shank that engages the upper conductive layer 26 which is preferably the electrically neutral layer. The other pin 90a has a conductive portion 96 nearer its lower end that engages the lower conductive layer 28 which is preferably the "phase" power layer. Both pins, as shown in greater detail in FIGS. 7 and 8, are generally cylindrical and are made of a durable metal. At their upper end of both pins an enlarged cylindrical portion 98 is provided with metal exposed to form a ground contact in the upper ground layer 36. At the conductive portions 94 and 96, the metal is also exposed so that it makes a good electrical contact with the conductive material which is engaged thereby. Above and below these conductive areas the pin is coated with an insulating material 100 such as oxide coatings, polymeric materials, ceramics etc. Extending axially along the length of each pin is a small passage 102 which connects with a transverse passage 104 forming ports at the lower end of the pin. These passages are utilized to provide for the dispensing of a sealant through the pins and into the panel 10 when the probe coupler 84 is withdrawn from one installation location.

FIG. 6 illustrates a portion of a pair of panels 10 as they appear when installed as for a power and signal transmitting system according to our invention. As shown, the panels are placed directly on the basic floor 48 which may be concrete, wood or any other material. In some instances, the panels may provide the dual purpose of sub-flooring by being placed directly over floor joists or other framework. When held in place as by the screws or bolts 46 and with the necessary interconnectors 50a and 50b intalled, the entire area of panels can be covered by a suitable carpet 106 or some other decorative floor covering. Thereafter, the probe couplers 84 can be installed at the locations where power or signal energy is needed near appliances or telephones or other types of signal devices. The pins 90 and 90a of the coupler provide a good, reliable electrical contact with their respective panel layers 26, 28 and 36.

With the present invention, the need for floor ducting as conduits for electrical wiring can be substantially eliminated, and the provisions of new or relocated electrical and communication outlets is merely a matter of withdrawing and installing a probe coupler 84 at the desired location.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. An area type electrical energy distribution system adapted for installation on the structural floor of a building and comprising a plurality of panel units arranged adjacent to each other and electrically interconnected, said panel units being installed in the same plane on the structural floor with the edges of adjacent panel units spaced apart, elongated strip type tie-down means engaging the edge portions of adjacent panels and fastener means for securing said tie down means to said building floor; each of said panel units having at least two internal conductive layers separated by a central dielectric layer and covered by upper and lower dielectric layers with upper and lower outer conductive layers covering said upper and lower dielectric layers respectively, and conductive edge means interconnecting said outer conductive layers; means for applying electrical energy to said internal conductive layers of at least one of said panel units; and coupler means randomly located on at least one of said panel units for extracting energy from said internal conductive layers.

2. The system as described in claim 1 wherein said tie down means and upper outer conductive layers are of different materials so that junctions between connected panel units can be detected.

3. The system as described in claim 1 including shoulder means forming a recess along the upper outer edges of said panels so that said strip-type tie-down means are substantially flush with the upper surface of adjoining panels.

4. The system as described in claim 1 wherein said conductive edge means comprises a metallic strip surrounding the edge of each panel and interconnecting said upper and lower outer conductive layers so that the panel is completely enveloped by conductive material, said internal conductive layers having edges terminating at a distance inwardly from said edge strip.

5. The system as described in claim 4 wherein said upper and lower internal conductive layers are a metallic foil having a thickness of from 0.0005 – 0.006 inches.

6. The system as described in claim 4 wherein the upper and lower internal conductive layers are a metallic sheet material having a thickness of from 0.006 – 0.020 inches.

7. The system as described in claim 5 wherein said outer conductive layers are metallic sheet material having a thickness in the range of 0.006 to 0.020 inches.

8. The system as described in claim 1 wherein said dielectric layers between said conductive layers are wood sheets.

9. The system as described in claim 1 wherein at least one of said dielectric layers between said conductive layers is a sheet formed of compressed and bonded wood particles.

10. The system as described in claim 4 including a relatively thin protective layer of dielectric material covering at least the upper outer conductive layer on said panels.

11. The system of claim 1 wherein said means for applying electrical energy includes power distribution means and cable means for interfacing and applying power to one of a group of panels, means for switching and controlling signal energy and for superimposing this signal energy on the power applied, said panels being arranged in groups installed in preselected areas, means for electrically interconnecting the panels within each group and means for electrically isolating the various panel groups.

12. A laminated panel unit for use in an area type electrical distribution system comprising:
a pair of internal conductive layers and a central dielectric layer separating said conductive layers; upper and lower dielectric layers covering the top of one internal conductive layer and the bottom of the other internal layer;
upper and lower outer conductive layers covering the top of said upper dielectric layer and the bottom of said lower dielectric layer; outer edge means of conductive material interconnecting said upper and lower outer conductive layers around the periphery of said panel;
and connector means on the edge of and located between said upper and lower outer conductive layers of said panel unit for electrically interconnecting said internal conductive layers of adjacent like panels.

13. The laminated panel unit as described in claim 12 wherein said upper and lower outer conductive layers and said outer edge means are comprised of metallic sheet material covering said upper and lower dielectric layers.

14. The laminated panel unit as described in claim 12 wherein said dielectric layers are sheets of wood material.

15. The laminated panel unit as described in claim 12 wherein said internal conductive layers are foil layers having a thickness of 0.0005 – 0.006 inches with outer edges which terminate at a substantially uniform distance from said outer edge means so that said internal conductive layers are electrically isolated from the outer conductive layers of the panel.

16. The laminated panel unit as described in claim 12 wherein said internal conductive layers are sheet metal members having a thickness of 0.006 – 0.020 inches with outer edges which terminate at a substantially uniform distance from said outer edge means so that said internal conductive layers are electrically isolated from the outer conductive layers of the panel.

17. The laminated panel unit as described in claim 12 wherein said connector means comprises a first connector unit on one side edge of the panel unit with portions thereof removed to expose adjacent surface areas of said internal conductive layers; a second connector unit on another side of said panel unit including vertically spaced apart conductive connector strip members attached to and extending from the edges of said internal conductive layers and adapted to engage the adjacent surface areas of a first connector unit on an adjoining panel unit, and means for connecting said outer conductive layers when either said first or said connector units are engaged with a mating unit.

18. The laminated panel unit as described in claim 17 wherein said first connector unit and said second connector unit have outwardly extending tab portions which connect with mating tab portions on the connector unit of an adjoining panel unit to form said means for connecting the outer conductive layers of the panel units.

19. The laminated panel unit as described in claim 18 wherein each of said connector units include an outwardly extending bottom portion which, together with said tab portions form an enclosure including said connector strip members, and a potting compound in said enclosure surrounding said strip members.

20. The laminated panel unit as described in claim 19 including a cover means extending over and completely covering said enclosure and said potting compound and overlapping the edges of adjoining panel units when their said connector units are together.

21. In a building having a planar base structure, an area type electrical energy distribution system comprising:

a plurality of relatively rigid, laminated panel units arranged adjacent to each other in the same plane on the base structure with their edges spaced apart, each said panel unit having two internal conductive layers separated by a central dielectric layer, upper and lower dielectric layers on the top of one said internal conductive layer and on the bottom of the other said internal conductive layer, upper and lower outer conductive layers covering said upper and lower dielectric layers and a conductive edge strip interconnecting said upper and lower outer conductive layers; connector means for electrically connecting adjacent panel units so that electrical energy can flow through the said internal conductive layers of adjacent panel units; and tie-down means for securing said panel units to said building base structure.

22. A laminated panel unit adapted for use with other similar units to form an area type electrical power and signal distribution system, said unit comprising:

a pair of internal conductive layers of similar size and shape separated by a central dielectric layer of uniform thickness; upper and lower dielectric layers covering the top of one internal conductive layer and the bottom of the other internal layer; upper and lower outer conductive layers covering the top of said upper dielectric layer and the bottom of said lower dielectric layer, and an edge shielding means interconnecting said outer conductive layers around the periphery of each said unit, said upper and lower dielectric layers and outer conductive layers all being slightly larger in both planform dimensions than said internal conductive layers, so that the latter are recessed inwardly from the periphery of each panel unit and from said edge shielding means;

and connector means on the edge of said panel unit attached to said internal conductive layers for interconnecting internal conductive layers of an adjacent like panel unit and located between said outer conductive layers.

* * * * *